United States Patent Office 3,360,425
Patented Dec. 26, 1967

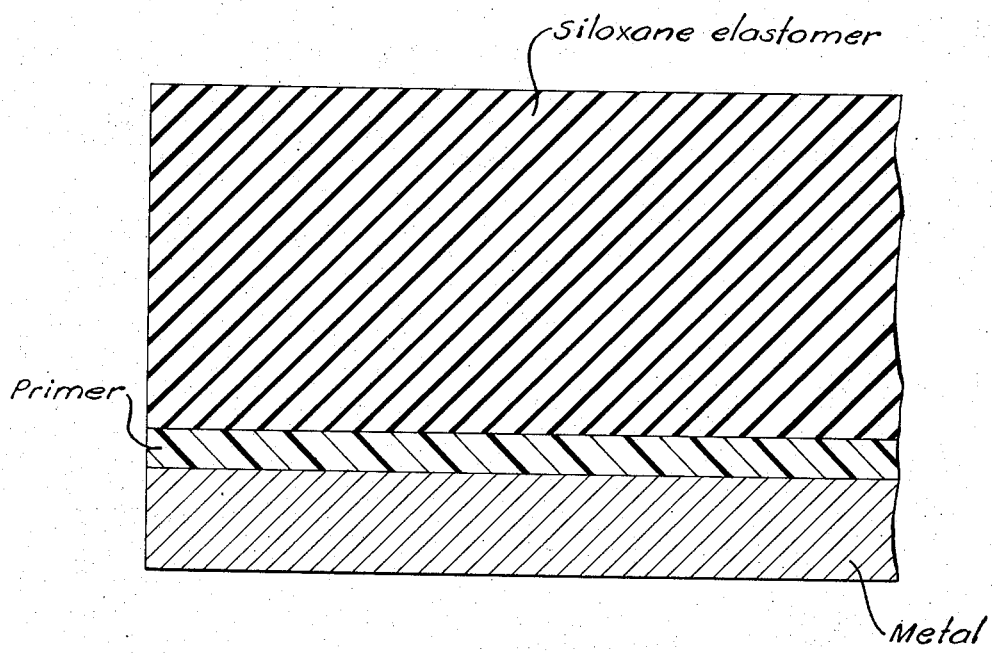

3,360,425
OIL RESISTANT SILICONE RUBBER METAL LAMINATES AND METHOD OF MAKING SAME
Jack L. Boone, Midland, Mich., assignor to Dow Corning Corporation, Midland, Mich., a corporation of Michigan
Filed Nov. 12, 1963, Ser. No. 323,136
21 Claims. (Cl. 161—186)

This invention relates to a new, hot-oil resistant bonding agent for bonding metals together with siloxane elastomers.

Silicone rubber gaskets and seals are being increasingly used for gaskets, transmission seals, etc. for internal combustion engines. Such a use frequently brings the siloxane elastomers in contact with hot oil, fuel, and transmission fluid. The various gaskets and seals made out of siloxane elastomers frequently have metal backings or other supports. In such cases, primers are usually required to give proper adhesion of the siloxane rubber to the metal supports. With presently known primers the bond between elastomer and metal is frequently broken by prolonged contact with hot engine fluids, so that the elastomer can be peeled from the metal backing like the rind from a tangerine unless the elastomer-metal bond is "post cured," i.e. cured well beyond what is needed to vulcanize the elastomer. Replacement of the gasket or seal is then required.

The object of this invention is to create a metal-elastomer seal that resists the prolonged effects of hot engine fluids without the necessity for the post curing of the seal.

Also, most presently-known primers for enhancing metal-siloxane elastomer bonds cure by means of moisture in the air. Therefore, when the humidity is low, trouble may develop with the curing. It is another object of this invention to provide a primer for metal-siloxane lastomer bonds which cures independently of the humidity of the air, giving more uniform results.

This invention comprises a composition of matter consisting essentially of (1) 5 parts of an aromatic epoxide resin or a composition of the formula

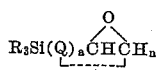

(2) from 2 to 50 parts of a liquid siloxane consisting essentially of the formula

any remaining units being of the formula

there being no more

units than twice the number of

units present in the polymer, or a monovinyl siloxane in liquid form; and (3) a sufficient amount of $R_3SiR'NHR''$ to allow curing of the composition.

R is a lower alkoxy or a hydrocarbyl-substituted isocyanoxy radical; Q is a divalent or trivalent radical consisting of carbon and hydrogen, any other atoms present being oxygen that is attached by means of an ether linkage; $n$ is either 1 or 2, $n$ being 2 when Q is part of a cyclic structure; Vi is the vinyl radical; Q' is a methyl or phenyl radical, there being no more than one phenyl radical attached to any silicon atom; $a$ is 0 or 1; R' is a divalent aliphatic hydrocarbon radical, and R'' is a hydrogen atom, an alkyl radical, or an aminoalkyl radical.

R can be any lower alkoxy radical such as methoxy, ethoxy, hexoxy, isopropoxy, etc.; or R can be a hydrocarbyl-substituted isocyanoxy radical, which can be of the following formulae:

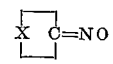

and

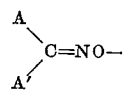

A and A' are monovalent hydrocarbon radicals, and X is a divalent hydrocarbon radical. Therefore, R can be dimethyl isocyanoxy, methyloctadecyl isocyanoxy, phenylcyclohexyl isocyanoxy, vinylcycloxexenyl isocyanoxy, diisopropyl isocyanoxy,

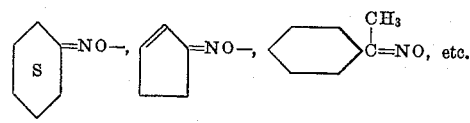

Q can be any divalent or trivalent radical consisting of carbon and hydrogen, any other atoms present being oxygen that is attached by means of an ether linkage, such as methylene, octadecylene, isobutylene, ccyclohexylene, cyclohexenylene, phenylene, butadiylene, vinylene, $$-CH_2OCH_2-, \quad -CH_2CH_2CH_2OCH_2-$$

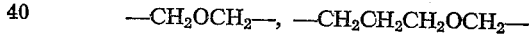

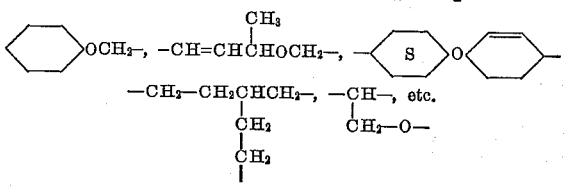

R' can be any divalent aliphatic hydrocarbon radical such as methylene, propylene, octadecylene, isobutylene, cyclohexylene, cyclohexenylene and butadiylene, etc.

R'' can be hydrogen, or any alkyl radical such as methyl, ethyl, octadecyl, isopropyl, etc.; or any aminoalkyl radical such as $-CH_2CH_2NHCH_2CH_2NH_2$,

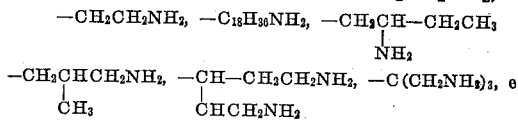

All the ingredients of the compositions of this invention are well known to the prior art.

By the term "aromatic epoxide resin" it is meant those resins that are produced by the reaction of polyhydric phenols with either polyfunctional halohydrins or polyepoxides or mixtures thereof to form complex reaction products containing terminal epoxide groups

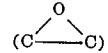

The polyhydric phenols used in making the epoxide resins employed herein include any of the phenols containing two or more phenolic hydroxyl groups, which can be on one phenyl ring as in resorcinol, or in different, fused ring systems, as in 1,5-dihydroxy naphthalene, or in different ring systems which are attached by chains composed of one or more atoms, in which case the chains should be free from elements which interfere with the reaction of the polyepoxides with the phenolic hydroxyl groups.

The phenolic nuclei can contain substituents (such as ring substituted halogen atoms) providing that they also do not interfere with the aforesaid reaction.

Illustrative of polyhydric phenols which can be used in making the epoxide resin copolymers are monophenyl phenols such as resorcinol, hydroquinone, catechol, phloroglucinol; polyphenyl phenols such as bisphenol(p,p-dihydroxydiphenyl dimethylmethane), p,p-dihydroxy benzophenone, p,p-dihydroxydiphenyl, p,p-dihydroxydibenzyl, bis(4-hydroxyphenyl)sulfone, 2,2 - dihydroxy-1,1-dinaphthylmethane, polyhydroxynaphthalenes and anthracenes, o,p,o,p-tetrahydroxydiphenyldimethylmethane, etc.

Also operative in this invention are polyhydric phenols which are condensation products of simpler polyhydric phenols with dichlorides such as dichlorodiethyl ether and dichlorobutene and are assumed to have one of the following general formulae:

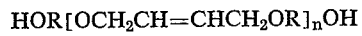

wherein R is the residue from the phenol and $n$ is at least 1. These polymeric condensation products consist of the dihydric phenol residues united or joined by and through the residues from the organic dichlorides.

A special case of interest and operative herein involves the condensation of complex polyhydric phenols with dibasic acids. For example, the condensation of adipic acid with a polyhydric phenol produces a polymer of the general formula

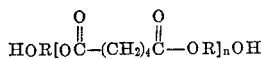

in which R is the residue from the phenol and $n$ is at least 1.

One of the best known and preferred of the polyhydric phenols operative herein is bis-phenol (p,p'-dihydroxy diphenyldimethyl methane).

The polyepoxides which are operative herein as reactants with the polyhydric phenols contain two or more epoxide groups. The simplest diepoxides contain at least 4 carbon atoms such as 1,2 epoxy-3,4 epoxy butane. The epoxy groups can be separated from each other by ether groups or linkages as in the case of bis-(2,3 epoxy propyl)ether and bis-(2,3 epoxy 2-methyl propyl)ether. Also operative herein are the more complex polyepoxides such as those prepared by reacting 2 or more mols of a diepoxide with 1 mol of dihydric phenol, or 3 or more mols of a diepoxide with 1 mol of trihydric phenol, etc. Polyepoxides derived from polyhydric alcohols such as mannitol, sorbitol, erythritol or polyallyl alcohol can also be used. The polyepoxy compounds used herein can have varying structures and can be of complex structure so long as they do not contain groups which interfere with the reaction between the epoxide groups and the phenolic hydroxyl groups. The polyepoxide reactants employed herein should be substantially free from reactive groups other than epoxide and aliphatic hydroxyl groups.

Simple diepoxides of a high degree of purity can be prepared and obtained by fractional distillation to separate them from byproducts formed during their manufacture. For example, bis-(2,3-epoxy propyl)ether or diglycid ether can be produced and separated by fractional distillation to give products of high purity. More complex polyepoxides of higher molecular weight are generally difficult to isolate by fractional distillation, but they can be employed herein after purification to remove objectionable inorganic impurities and catalysts such as caustic alkali. The high molecular weight diepoxide or polyepoxide with admixed byproducts such as monoepoxides is operative herein. Particularly well known and useful herein are the reaction products of, for example, epichlorohydrin with a polyhydric alcohol. A specific example of this reaction involves 1 mol of a trihydric alcohol reacted with 3 mols of epichlorohydrin and a catalyst. The epoxide group of the epichlorohydrin reacts with a hydroxy group of the alcohol and subsequent treatment removes chlorine from the reaction product thus producing the desired polyepoxide. Such polyepoxides can contain less than 3 epoxy groups per molecule even though 3 mols of epichlorohydrin are reacted with 1 mol of a trihydric alcohol. Complex side reactions apparently take place with the resulting production of other compositions containing free hydroxyl groups or cyclic ring compounds or polymeric compounds which can be present in the resulting product. Nevertheless, such products can be employed as polyepoxides for reaction with polyhydric phenols to form the resinous epoxides of this invention.

As noted supra, the polyepoxides can contain varying small amounts of admixed monoepoxides. To the extent that monoepoxides are present they will react with the polyhydric phenols to form terminal groups or residues containing hydroxyl groups and to the extent that such terminal hydroxyl groups are present the complex polyepoxide compositions will contain complex epoxy-hydroxyl compounds containing both terminal epoxide containing residues and terminal hydroxyl containing residues. The presence of monoepoxides or of monoepoxy-hydroxyl compounds does not interfere with the desired reaction provided a sufficient amount of polyepoxides is present to serve as polyfunctional reactants with polyhydric phenols.

The reaction conditions and proportions of reactants to be employed and obvious variations of the reaction as well as alternative reactions are set forth in full detail in U.S. Patent 2,592,560 issued Apr. 15, 1952.

Alternatively, the polyhydric phenol can be reacted with a polyfunctional chlorohydrin such as monochlorohydrins for example epichlorohydrin, dichlorohydrins, for example, glycerol dichlorohydrin, bis-(3-chloro, 2-hydroxy propyl)ether, 1,4-dichloro-2,3-dihydroxy butane, 2-methyl-2-hydroxy-1,3-dichloropropane, bis-(3-chloro, 2-methyl, 2-hydroxy propyl)ether, and other mono and dichlorohydrins derived from aliphatic olefins, mannitol, sorbitol and other alcohols. In short the term "polyfunctional chlorohydrin" as employed herein includes all compounds which contain at least one epoxide and at least one chlorine atom in the molecule and all compounds containing a chlorine atom and an OH group on adjacent carbon atoms and at least one other chlorine atom in the molecule. It is preferred that the chlorohydrin be substantially free of other functional groups. Epichlorohydrin and/or glycerol dichlorohydrin are particularly useful in this invention.

The proportions of reactants as well as reaction conditions and variations and alternative procedures involved in the polyhydric phenol-polyfunctional chlorohydrin reaction are well known and are set forth in detail in U.S. Patents 2,615,007 and 2,615,008.

The compounds

are also well known. Their method of preparation may be found in Canadian Patent 580,908.

Ingredient (2) is likewise well known in the art, and any book on silicones will give methods of synthesis of these materials.

The amino-silyl compounds of ingredient (3) are also well known; descriptions and methods of preparation are available in U.S. Patents 2,715,133, 2,832,754, 2,971,864 and 3,046,295.

There are two available methods for the application of the compositions of this invention to improve the hot oil resistance of siloxane elastomer-metal bonds. The one-dip method and the two-dip method both of which result in articles as illustrated in the accompanying drawing wherein the primer is the three component material heretofore mentioned.

The two-dip method comprises (1) coating the metal surface with a mixture consisting essentially of ingredient 1 and sufficient ingredient 3 to effect curability of the mixture. The epoxide-amine composition is then cured at room temperature or by heating. The curing is believed to take place through the reaction of amine and epoxy groups, (2) the second step is to coat the epoxide-amine composition with ingredient 2 and cure by air drying or heating, (3) the third step is to contact this coating with an unvulcanized siloxane elastomer that contains a vinyl-specific vulcanization catalyst, and (4) the fourth step is to vulcanize the elastomer.

The one-dip method comprises (1) coating the metal surface with the composition of matter described above in this application and curing by air drying or heating, (2) contacting an unvulcanized siloxane elastomer that contains a vinyl-specific vulcanization catalyst to this coated metal surface, and (3) vulcanizing.

The words "consisting essentially of" are used in the above description of the compositions of this invention. This means that the compositions may contain other materials besides the stated ingredients so long as the other materials do not interfere with the utility of the composition as a bonding agent. Examples of such materials are solvents to increase the shelf-life by inhibiting gelling of the compositions and to lower the viscosity of the compositions or the ingredients thereof. For example, a lower alcohol is frequently used as a solvent for ingredient (2) in the two-dip method. Also ingredients 1 and 3 are usually dissolved in a solvent whether the compositions are designed for the one-dip or for the two-dip method to prevent gelling of the epoxide and amino-alkyl silicone. Alcohols and ethers with a high oxygen content appear to make the best solvents, for example, 2-ethoxyethanol.

The compositions of this invention can be employed with any siloxane elastomer. These silicone rubbers are well-known materials and are being widely sold for many applications.

The unvulcanized siloxane elastomer that is bonded to metal by the compositions of this application must contain a vinyl-specific vulcanization catalyst. The term "vinyl specific" means that the vulcanization catalyst generates free radicals primarily in vinyl groups rather than in the methyl or other alkyl radicals normally found in siloxane elastomers. This does not, however, mean that the siloxane elastomer must contain vinyl groups. If, however, the elastomer does not contain vinyl groups, it is wise to add a second catalyst such as benzoyl peroxide or dichlorobenzoyl peroxide, to enhance the vulcanization of the elastomer. The vinyl specific catalyst is required to cause the bonding composition of this application to adhere to the siloxane elastomer.

Examples of vinyl-specific catalysts are peroxides such as tertiary butyl peroxide [(CH$_3$)$_3$COOC(CH$_3$)$_3$], dicumyl peroxide, [C$_6$H$_5$(CH$_3$)$_2$COOC(CH$_3$)$_2$C$_6$H$_5$] and a compound known as Varox

[(CH$_3$)$_3$COOC(CH$_3$)$_2$CH$_2$CH$_2$(CH$_3$)$_2$—COOC(CH$_3$)$_3$].

The following examples are for illustrative purposes only, and are not to be construed as in any way restricting this invention, the scope of this invention being solely shown by the claims.

Example 1

Two solutions were prepared. Solution (a) consisted of 10% by weight of the hydrolyzate of vinyltrimethoxysilane plus 90% of isopropyl alcohol. Solution (b) consisted of 8.7 parts by weight of an epoxy resin of the formula:

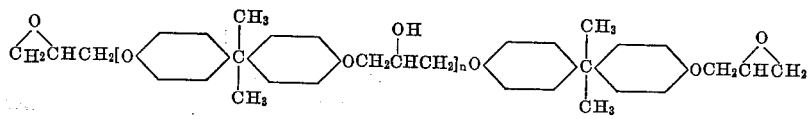

with a molecular weight of 900–1000, 1.3 parts of (CH$_3$O)$_3$Si(CH$_2$)$_3$NHCH$_2$CH$_2$NH$_2$ 45 parts of C$_2$H$_5$OC$_2$H$_4$OH and 44.5 parts of methylisobutyl ketone.

Five steel strips were prepared in the following manner: strip number 1 was dipped in solution (a) and dried for 15 minutes at 300° F.; strip number 2 was dipped in solution (b) and air dried for 15 minutes; strip number 3 was dipped in solution (b) and oven dried for 10 minutes at 300° F.; strip number 4 was dipped in solution (b) and air dried; then it was dipped in solution (a) and dried for 10 minutes at 300° F.; strip number 5 was dipped in solution (b) and dried 10 minutes at 300° F.; then it was dipped in solution (a) and dried 10 minutes at 300° F.

The strips were then contacted with unvulcanized siloxane elastomer containing Varox catalyst (see above), and the elastomer was vulcanized.

These elastomer-bonded strips, and two other sets of five strips that were prepared in an identical manner, were immersed in Sun 109 automatic transmission fluid maintained at 150° C. throughout the testing period. The condition of the metal-elastomer bond is shown below for two different periods of immersion. "Excellent" means that on pulling the elastomer from the metal, there was pure cohesive failure of the rubber, i.e. the elastomer failed before the bond. "Good" means that only a small amount of the bond failed before the elastomer failed. "Fair" means that a large portion of the bond failed before the elastomer failed. "Poor" means that the elastomer peeled off completely, leaving bare metal.

| Strip | Initial Adhesion | Adhesion after 80 hours | Adhesion after 180 hours |
|---|---|---|---|
| 1 | Excellent | Poor | Poor. |
| 2 | Poor | do | Do. |
| 3 | do | do | Do. |
| 4 | Excellent | Excellent | Excellent. |
| 5 | do | do | Do. |

Example 2

Three batches of a composition was formulated consisting of 100 parts of an epoxy compound of the formula

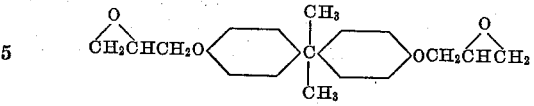

40 parts of (CH$_3$O)$_3$Si(CH$_2$)$_3$NHCH$_2$CH$_2$NH$_2$, and 150 parts of the hydrolyzate of vinyltrimethoxysilane, mixed as (1) 15% solids, (2) 20% solids, and (3) 25% solids in isopropyl alcohol. These were applied to four steel strips each and air cured for about two hours. The strips were then contacted with an unvulcanized siloxane elastomer containing Varox catalyst (see above) and the elastomer was cured.

The strips were immersed in automatic transmission fluid at 300° F. The condition of the metal-elastomer bond at various time intervals is shown below:

|  | Initial Adhesion | 80 hours | 170 hours | 250 hours |
|---|---|---|---|---|
| Batch 1 | Excellent | Excellent | Good | Fair. |
| Batch 2 | do | do | Excellent | Excellent. |
| Batch 3 | do | do | do | Do. |

Example 3

A composition of 4.72 parts of the epoxide

4.16 parts of the aminosilane $(CH_3O)_3Si(CH_2)_3NHCH_2CH_2NH_2$, 5.00 parts of a vinyldimethylsilyl endblocked dimethylsiloxane fluid having about six silicon atoms per molecule, and 58.52 parts of isopropyl alcohol was formulated. The composition was applied to steel strips and used to bond siloxane elastomers in a manner similar to Example 2. The strips were immersed in automatic transmission fluid at 150° C. the results are shown below.

| Initial Adhesion | 60 hours | 90 hours | 110 hours |
|---|---|---|---|
| Excellent | Excellent | Excellent | Excellent. |

Example 4

A composition of 4.4 parts of $(CH_3O) Si (CH_2)_3NH-CH_2CH_2NH_2$, 5.0 parts of

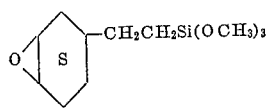

10.6 parts of a vinyldimethylsilyl endblocked dimethylsiloxane fluid having about six silicon atoms per molecule, and 80 parts of isopropyl alcohol was formulated. It was used as a bonding agent in the manner of Example 2.

The results of the durability test in automatic transmission fluid at 150° C. are shown below:

| 90 hours | 190 hours |
|---|---|
| fair | good |

Example 5

The following formulations were made, as 20% solids in isopropyl alcohol. The ingredients of Example 3 were used.

|  | Amino Ingredient (parts) | Epoxide Ingredient (parts) | Vinyl siloxane fluid Ingredient (parts) |
|---|---|---|---|
| Formulation 1 | 4.4 | 5.0 | 2 |
| Formulation 2 | 4.4 | 5.0 | 6 |
| Formulation 3 | 4.4 | 5.0 | 10 |
| Formulation 4 | 4.4 | 5.0 | 14 |
| Formulation 5 | 4.4 | 5.0 | 20 |
| Formulation 6 | 4.4 | 5.0 | 50 |

Each of these formulations were used as a bonding agent in the manner of Example 2. The bonds were tested by immersion in automatic transmission fluid at 150° C. The results are below:

|  | 60 hours | 180 hours |
|---|---|---|
| Formulation 1 | Excellent | Poor. |
| Formulation 2 | do | Fair. |
| Formulation 3 | do | Excellent. |
| Formulation 4 | do | Do. |
| Formulation 5 | do | Do. |
| Formulation 6 | do | Do. |

Example 6

When the following ingredients are combined, a composition is formed that forms an effective oil-resistant bond between metal and siloxane elastomer:

(a) 20 grams of 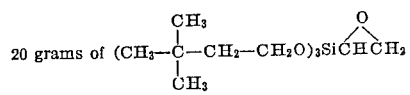

10 grams of $[(CH_3)_2C=NO]_3SiCH_2NHCH_3$ 30 grams of a siloxane consisting essentially of 90% $\left(\begin{array}{c}Vi\\|\\OSi\\|\\Me\end{array}\right)$ and 10% $\left[\begin{array}{c}Me\\|\\OSi\\|\\\phantom{x}\end{array}\right]$ units, and having a molecular weight of ~2,000 plus 100 grams of ethylether.

(b) 20 grams of 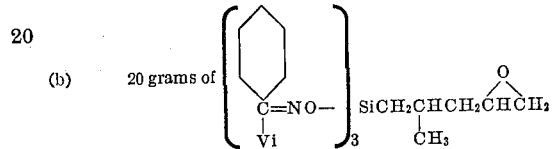

12 grams of 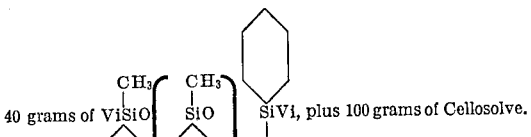

40 grams of 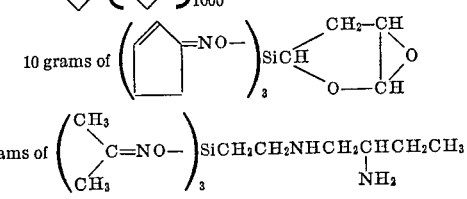

SiVi, plus 100 grams of Cellosolve.

(c) 10 grams of 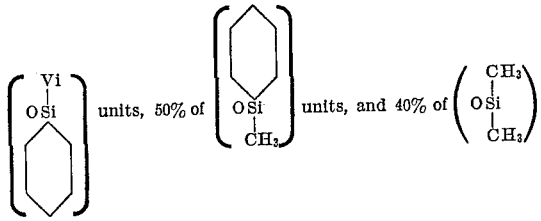

5 grams of $\left(\begin{array}{c}CH_3\\\phantom{x}\diagdown\\\phantom{x}\phantom{x}C=NO-\\\phantom{x}\diagup\\CH_3\end{array}\right)_3 SiCH_2CH_2NHCH_2CHCH_2CH_3$ \newline $\phantom{xxxxxxxxxxxxxxxxxxxxxxxxxxxxxxxxxxxxx}NH_2$ 100 grams of a siloxane consisting essentially of 10%

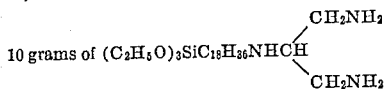 units, 50% of ... units, and 40% of ...

units with a molecular weight of 3,000 plus 200 grams of cyclohexane.

(d) 20 grams of the reaction product of 100 g. of resorcinol and 100 grams of 1,2-epoxy-3,4-epoxybutane, 10 grams of $(C_2H_5O)_3SiC_{18}H_{36}NHCH\begin{array}{c}CH_2NH_2\\\diagdown\\\diagup\\CH_2NH_2\end{array}$ plus 100 grams of the hydrolysis product of vinyltrimethoxysilane.

(e) 20 grams of 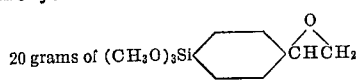

10 grams of
$(CH_3O)_3SiCH_2CH_2CH_2NHCH_2CH_2NH_2$ plus 50 grams of the hydrolysis product of vinyltrimethoxysilane.

That which is claimed is:

1. A composition of matter consisting essentially of
   (1) 5 parts of a material selected from the group consisting of aromatic epoxide resins and

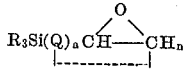

(2) from 2 to 50 parts of the material selected from the group consisting essentially of a liquid siloxane of the formula

any remaining units being of the formula

there being no more

units than twice the number of

units present in the polymer, and a monovinyl siloxane in liquid form, and
   (3) a sufficient amount of

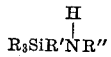

to allow curing of the composition, where R is selected from the group consisting of lower alkoxy and hydrocarbyl-substituted isocyanoxy groups, $a$ is an integer of 0 through 1, Q is selected from the group consisting of divalent and trivalent radicals consisting of carbon and hydrogen, any other atoms present being oxygen that is attached by means of an ether linkage, $n$ is an integer of 1 through 2, $n$ being 1 when Q is part of a cyclic structure, Vi is the vinyl radical, Q' is selected from the group consisting of methyl and phenyl radicals, there being on the average no more than one phenyl radical per silicon atom, R' is a divalent aliphatic hydrocarbon radical, and R'' is selected from the group consisting of hydrogen, alkyl and aminoalkyl radicals.

2. A composition of matter where the composition of claim 1 is in a solvent.

3. A composition of matter consisting essentially of 5 parts of an aromatic epoxide resin, from 2 to 50 parts of a monovinyl siloxane in liquid form, and a sufficient amount of

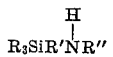

to allow curing of the composition, where
   R is selected from the group consisting of lower alkoxy and hydrocarbyl-substituted isocyanoxy groups,
   Vi is the vinyl radical,
   R' is a divalent aliphatic hydrocarbon radical, and
   R'' is selected from the group consisting of hydrogen, alkyl, and aminoalkyl radicals.

4. The composition of claim 3 where the aromatic epoxide resin is in a solvent.

5. The composition of claim 3 where the aromatic epoxide resin is the condensation product of epichlorohydrin and dimethyl(bis-p-hydroxyphenyl)methane.

6. The composition of claim 3 where the epoxy resin is the condensation product of epichlorohydrin and dimethyl(bis-p-hydroxyphenyl)methane and the aminosilane is $(CH_3O)_3Si(CH_2)_3NHCH_2CH_2NH_2$.

7. A composition of matter consisting essentially of 5 parts of

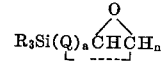

from 2 to 50 parts of a liquid siloxane consisting essentially of the formula

any remaining units being of the formula

there being no more

units than twice the number of

units present in the polymer, and a sufficient amount of

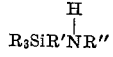

to allow curing of the composition, where
   R is selected from the group consisting of lower alkoxy and hydrocarbyl-substituted isocyanoxy,
   Q is selected from the group consisting of divalent and trivalent radicals consisting of carbon and hydrogen, any other atoms present being oxygen that is attached by means of an ether linkage,
   $a$ is an integer of 0 through 1,
   $n$ is an integer of 1 through 2,
   Vi is the vinyl radical,
   Q' is selected from the group consisting of methyl and phenyl radicals, there being on the average no more than one phenyl radical per silicon atom,
   R' is a divalent aliphatic hydrocarbon radical, and
   R'' is selected from the group consisting of hydrogen, alkyl and aminoalkyl radicals.

8. The composition of claim 7 where said composition is in a solvent.

9. The composition of claim 7 where R is methoxy.

10. The composition of claim 7 where Q is

11. The composition of claim 7 where Q' is methyl.

12. The composition of claim 7 where R is ethoxy.

13. The composition of claim 7 where Q is

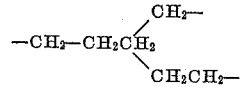

and $n$ is 1.

14. The composition of claim 7 where R' is the propylene radical.

15. The composition of claim 7 where R'' is

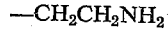

16. The process of improving the hot oil resistance of siloxane elastomer-metal bonds by
    (1) coating the metal surface with a material consisting essentially of an aromatic epoxide resin and sufficient

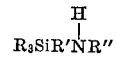

to cause curing of the epoxide-amine composition, where R is selected from the group consisting of lower alkoxy and hydrocarbyl-substituted isocyanoxy, R' is a divalent aliphatic hydrocarbon radical, and R" is selected from the group consisting of hydrogen, alkyl, and aminoalkyl radicals, and curing the epoxide-amine composition, (2) coating the epoxide-amine composition with a monovinyl siloxane in liquid form and curing it, (3) contacting this coating with an unvulcanized siloxane elastomer that contains a vinyl-specific vulcanization catalyst, and (4) vulcanizing the siloxane elastomer.

17. The process of claim 16 where an alcohol solution of the monovinyl siloxane is used.

18. The process of claim 16 where the epoxide-amine composition used is in a solvent.

19. The process of improving the hot oil resistance of siloxane elastomer-metal bonds by (1) coating the metal surface with a composition of matter consisting essentially of 5 parts of

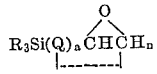

from 2 to 50 parts of a liquid siloxane consisting essentially of the formula

any remaining units being of the formula

there being no more

units than twice the number of

units present in the polymer, and a sufficient amount of

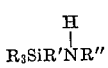

to allow curing of the composition, where
R is selected from the group consisting of lower alkoxy and hydrocarbyl-substituted isocyanoxy,
Q is selected from the group consisting of divalent and trivalent radicals consisting of carbon and hydrogen, any other atoms present being oxygen that is attached by means of an ether linkage,
a is an integer of 0 through 1,
n is an integer of 1 through 2,
Vi is the vinyl radical,
Q' is selected from the group consisting of methyl and phenyl radicals, there being on the average no more than one phenyl radical per silicon atom,
R' is a divalent aliphatic hydrocarbon radical, and
R" is selected from the group consisting of hydrogen, alkyl and aminoalkyl radicals, (2) contacting an unvulcanized siloxane elastomer that contains a vinyl-specific vulcanization catalyst to this coated metal surface, and (3) vulcanizing.

20. The process of claim 19 where the composition used is in a solvent.

21. An article of manufacture comprising
(A) a base metal,
(B) a bonding agent comprising a composition of matter consisting essentially of
(1) 5 parts of a material selected from the group consisting of aromatic epoxide resins and

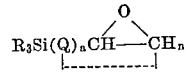

(2) from 2 to 50 parts of the material selected from the group consisting essentially of a liquid siloxane of the formula

any remaining units being of the formula

there being no more

units than twice the number of

units present in the polymer, and a monovinyl siloxane in liquid form, and (3) a sufficient amount of

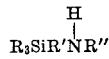

to allow curing of the composition, where R is selected from the group consisting of lower alkoxy and hydrocarbyl-substituted isocyanoxy groups, a is an integer of 0 through 1, Q is selected from the group consisting of divalent and trivalent radicals consisting of carbon and hydrogen, any other atoms present being oxygen that is attached by means of an ether linkage, n is an integer of 1 through 2, n being 1 when Q is part of a cyclic structure, Vi is the vinyl radical, Q' is selected from the group consisting of methyl and phenyl radicals, there being on the average no more than one phenyl radical attached to any silicon atom, R' is a divalent aliphatic hydrocarbon radical, and R" is selected from the group consisting of hydrogen, alkyl and aminoalkyl radicals, and (C) a siloxane elastomer which is bonded to the base metal.

References Cited

UNITED STATES PATENTS

| | | | |
|---|---|---|---|
| 2,601,337 | 6/1952 | Smith-Johannsen | 161—207 X |
| 2,819,245 | 1/1958 | Shorr | 260—834 X |
| 2,957,794 | 10/1960 | Shetterly et al. | 161—186 X |
| 3,022,196 | 2/1962 | Jenkins et al. | 117—127 |
| 3,166,527 | 1/1965 | Ender | 260—824 X |
| 3,170,962 | 2/1965 | Tyler | 161—186 X |
| 3,200,031 | 8/1965 | Rittenhouse | 161—207 X |
| 3,211,684 | 10/1965 | Eakins | 260—824 X |
| 3,284,398 | 11/1966 | Warren et al. | 161—186 X |
| 3,285,802 | 11/1966 | Smith et al. | 260—824 X |
| 3,297,186 | 1/1967 | Wells | 156—329 X |

EARL M. BERGERT, *Primary Examiner.*

HAROLD ANSHER, *Examiner.*

UNITED STATES PATENT OFFICE
CERTIFICATE OF CORRECTION

Patent No. 3,360,425　　　　　　　　　　　　　　December 26, 1967

Jack L. Boone

It is hereby certified that error appears in the above numbered patent requiring correction and that the said Letters Patent should read as corrected below.

Column 1, line 39, for "lastomer" read -- elastomer --; column 2, line 38, for "ccyclohexylene" read -- cyclohexylene --; column 4, line 9, for "hydroxy" read -- hydroxyl --; lines 65 to 67, the formula should appear as shown below instead of as in the patent:

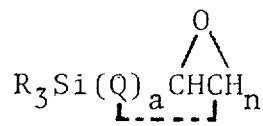

column 8, lines 25 to 30, for that portion of the formula reading

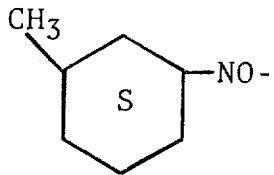　　　read　　　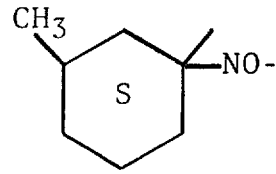

Signed and sealed this 11th day of February 1969.

(SEAL)
Attest:

EDWARD M. FLETCHER, JR.　　　　　　　　　　EDWARD J. BRENNER
Attesting Officer　　　　　　　　　　　　　Commissioner of Patents